2,937,118
AMINOPYRIDINE COMPOSITIONS

Elmar F. von Haxthausen, Bad Durkheim, Wilhelm Mathes, Ludwigshafen (Rhine), and Anton Wolf, Heidelberg, Germany, assignors to Dr. F. Raschig G.m.b.H., Ludwigshafen (Rhine), Germany, a limited-liability company of Germany No Drawing. Application June 27, 1956
Serial No. 594,102

1 Claim. (Cl. 167—65)

This invention relates to compositions containing 4-methyl-2-amino-pyridine and its acid salts in a pharmaceutical carrier, which may be solid, semi-solid or liquid, which compositions are useful in medicine as a combined analgesic sympathomimetic.

Substances of the adrenalin-ephedrine series, which are known to have sympathomimetic action, have little or no significant analgesic properties and, when an analgesic effect is present, it is not pronounced and has no marked effect on circulation.

The compound 4-methyl-2-amino-pyridine is known and its preparation is described in Berichte dtsch. chm. Ges., vol. 57, p. 791 (1924), under α-amino-γ-picoline. It is a mono-acid base which forms well crystallizing salts and is there stated to possess a cocaine-like action which, according to our tests, definitely does not exist.

According to our invention, we have found that pharmaceutical preparations, which may be administered parenterally, perorally or by means of suppositories, have a considerable analgesic action, and, in addition, have excellent analeptic properties with particular reference to respiratory stimulation, heart activity and vasoconstriction. Thus, the use of 4-methyl-2-amino-pyridine, in accordance with the present invention, not only has the advantages of good analgesic action but lacks the disadvantages of morphine, and particularly the damping or depressing effects of morphine on the vital functions.

4-methyl-2-amino-pyridine has been compared by us with 2-amino-pyridine, relatively little concerning which is known despite its biological activity. Poisoning with 2-amino-pyridine, 3-amino-pyridine, and 4-amino-pyridine produces the same general pattern of symptoms in white mice, rats, and cats, namely, excitation, tonoclonic convulsions, and death due to tetanic spasm with the characteristic tail phenomenon in white mice known from morphine. 4-methyl-2-amino-pyridine does not have such toxicity and has been discovered to have remarkable pharmaceutical action of an exceptionally protracted character. 4-methyl-2-amino-pyridine is more like sympathomimetics of the adrenalin-ephedrine series than like the amino-pyridines mentioned above, and also has a morphine-like action without the disadvantageous side effects of morphine. 4-methyl-2-amino-pyridine, for instance, causes no contraction of the nictitating membrane in cats and only occasionally a slight contraction of the spleen, not at all comparable with that produced by ephedrine, nor does it cause tachyphylaxis. These properties are important inasmuch as, with severe circulatory damage, a repeated ephedrine injection has, a rule, only a slight action or none at all, and, hence, a severely damaged circulatory system cannot be normalized by ephedrine. 4-methyl-2-amino-pyridine eliminates the collapse caused by Dilatol (phenyl-butyl-nor-oxyephedrine chlorohydrate), again in strong contrast to ephedrine, which has little action in the presence of severe Dilatol collapse.

Comparative tests were made with yohimbine, ergotamine, and Regitin [2-(N-p-tolyl-N-m-oxyphenyl-aminomethyl)-imidazolin] on the one hand, and 4-methyl-2-amino pyridine on the other hand. The first three substances substantially nullify the action of sympathomimetic drugs of the adrenalin-ephedrine series, but this is not true of 4-methyl-2-amino-pyridine. Suitable doses of the mentioned sympatholytics neutralized the action of ephedrine or Sympatol (p-methylamino-ethanol-phenoltartrate) to the extent of approximately 95% but inhibited the action of 4-methyl-2-amino-pyridine only to the extent of about 40–50%. The dosages used were as follows: yohimbine, 1 mg./kg.; ergotamine, 1.5 mg./kg.; Regitin, 0.8 mg./kg. We further found that 4-methyl-2-amino-pyridine favorably influenced histamine collapse in cats, whereas ephedrine failed in this respect. Avertin (tribromoethanol) inhibited the circulatory action of ephedrine to a much greater extent than of 4-methyl-2-amino-pyridine.

In frogs' hearts damaged by calcium deprivation in the nutrient solution, 4-methyl-2-amino-pyridine in a concentration of 1:100,000 has a positive inotropic action comparable to that of ephedrine and caffeine, but, unlike ephedrine and other compounds of the adrenalin-ephedrine series, 4-methyl-2-amino-pyridine has no positive chronotropic action. 4-methyl-2-amino-pyridine has a far greater analeptic action than can be attributed to 2-amino-pyridine and also has a good effect in barbiturate poisoning, being significantly better than that of pentylenetetrazol when the latter is used in a dose 4 to 5 times larger. In rabbits, the respiratory paralysis caused by 100 mg./kg. of morphine could be broken by 2–3 mg./kg. of 4-methyl-2-amino-pyridine, and the respiration frequency rose to 70% of the starting value before the morphine was given, and this value was maintained for 90 minutes and more. The observations made on cats and rabbits were confirmed on mice and rats, which were given injections of Avertin or Evipal (N-methyl-cyclohexenylmethylbarbiturate acid) in doses definitely above the lethal dose. Thus, 4-methyl-2-amino-pyridine is characterized by positive inotropic heat action, peripheral vasoconstriction, respiration stimulation, spasmolysis of the smooth muscles in the intestine and bronchi, and central nervous action of a sedative nature. It produces increase of cardiac output in defective hearts.

The deterioration of heart action caused by morphine, Dolantin (1-methyl-4-phenylpiperidine-4-carboxylic acid ethyl ester) and Polamidon (2-dimethylamino-4,4-diphenylheptanone) could be consistently eliminated wholly or partially by 4-methyl-2-amino-pyridine when used in concentrations of 1:500,000 to 1:1,000,000. Circulatory collapse caused in the cat by the above three preparations could be eliminated by 4-methyl-2-amino-pyridine.

Morphine and 4-methyl-2-amino-pyridine, despite their otherwise completely opposite action, were combined in proportions gradually changing from 1:8 to 8:1. The expected antagonism of the analgesic action did not occur but surprisingly it was found that the two substances supplemented each other in their analgesic action due to a synergistic effect.

In tests carried out on 32 dogs, the following properties of 4-methyl-2-amino-pyridine on the circulatory action were found:

(1) The intravenous threshold dose is 0.3 mg/kg.;
(2) Blood pressure rises in all cases after the administration of 4-methyl-2-amino-pyridine and in the dosage range of 0.3–0.8 mg./kg. the action is predominately diastolic, whereas dosages at and above 1.0 mg./kg. are strongly systolic;
(3) Venous pressure increases with dosages above 1.0 mg./kg.;
(4) The heart frequency is diminished;
(5) With intra-arterial injection, the blood vessels of the skin and of the resting musculature are constricted, whereas in the active musculature there is increased blood flow;

(6) The blood flow of the coronary heart vessel was increased in 7 of 12 cases and diminished in 5 cases;

(7) The Dilatol collapse was almost total, while the histamine collapse was in large part annulled;

(8) 4-methyl-2-amino-pyridine exhibits an extraordinarily long-lasting action.

As mentioned above, 4-methyl-2-amino-pyridine is suitable for use in three main dosage forms:

(1) In ampules for injection, the dosage amounts to 70–100 milligrams, with or without addition of procaine, for intravenous or intramuscular administration, as a 1–10% solution in any suitable sterile solvent liquid such as water or alcohol. The hydrochloric acid salt of the base may be used in the usual manner as may also other compatible salts, such, for example, as the sulphuric acid salt, the tartaric acid salt, and the malic acid salt. These salts of 4-methyl-2-amino-pyridine produce some pain upon injection and, therefore, are preferably combined with a local anesthetic, the dosage of which varies with the particular local anesthetic employed. In the case of procaine, the amount added is 10% of the pure base and all the dosages mentioned herein are calculated on the pure base, the molecular weight of which is 108. Dosages of the compatible salts can be readily calculated based upon the equivalent amount of the free base. Thus, for example, the molecular weight of the hydrochloric acid salt is 144.5 and the dosage used amounts not to 1 mg. of the free base per kg. of body weight but to 1.337 mg. of the hydrochloric acid salt per kg. of body weight, and the same principle applies to the other salts.

4-methyl-2-amino-pyridine is also combined with morphine or morphine-like compounds and has a synergistic effect, whereas morphine is contra-indicated in the case of serious accidents. Since the danger exists that the already existing circulation collapse will be deepened by the morphine, this danger can be overcome by 4-methyl-2-amino-pyridine. An exemplary combination includes 20 mg. of morphine, 100–150 mg. of 4-methyl-2-amino-pyridine, calculated as base, and 10–15 mg. of procaine.

The invention further includes ampules for veterinary therapy. In this case, a 5% solution of 4-methyl-2-amino-pyridine, or a salt thereof, calculated as base, is injected. The ampules are prepared in various sizes depending on the animals to be treated therewith and contain 1–10% of active ingredient, with which may be combined Novalgin (sodium phenyldimethylpyrazolonmethylaminomethanesulfonate) in the respective proportions of 1:4 to 1:5.

(2) The principal use of our new amino-pyridine compositions is peroral in the form of dragees or compressed tablets provided with a coating which permits intact passage through the stomach and dissolution in the small intestine. For the dragees or compressed tablets, only the free base 4-methyl-2-amino-pyridine is used and not the salts. This coating is necessary to effect a time delay in order that the drug may enter into the small intestine for dissolution and effective action to ensure obtaining at least the threshold value for the action. 4-methyl-2-amino-pyridine was found to have a definite sedative action and thus, in another exemplary form of the invention, a central nervous system regulant is added, such as caffeine or benzedrine. Thus, one dragee or compressed tablet contains, in addition to the usual tabletting materials, 200 mg. of 4-methyl-2-amino-pyridine and either 100 mg. of caffeine or 0.5 to 1 mg. benzedrine, optionally supplemented by 25 mg. of ephedrine, the dragee or compressed tablet being provided with a coating soluble in the small intestine and, therefore, being of enteric nature.

A tablet responding to the invention contains 200 milligrams of 4-methyl-2-amino-pyridine, 25 milligrams of ephedrine, and either 100 milligrams of caffeine or 0.5–1 milligram of benzedrine. The total weight of such tablet is 0.5–0.6 gram including the usual binding and other ingredients such as starch, dextrose, talc, etc. A dragee has the same composition except that the ephedrine is omitted.

(3) 4-methyl-2-amino-pyridine may also be used in the form of suppositories in which case the dosage and composition are the same as for the dragees or compressed tablets, viz., 200 mg. of 4-methyl-2-amino-pyridine base, and either 100 mg. of caffeine or 0.5 to 1 mg. benzedrine embedded in the usual carrier or filler, such as cocoa butter or synthetic fats. The total weight of a suppository, including the carrier as filler amounts to 1–5 grams.

From the foregoing, it will be appreciated that compositions according to the invention and containing 4-methyl-2-amino-pyridine are much more effective than other heart remedies, have a positive inotropic action which is at least as good as and usually superior to other heart remedies and have the important advantage of lacking the positive chronotropic action characteristic of other heart remedies. The new compositions are fully active when there is severe or extremely severe collapse of circulation under conditions in which ephedrine and related compounds fail. The analeptic action of 4-methyl-2-amino-pyridine is at least as good as that of pentylenetetrazol and unlike preparations of the adrenalin-ephedrine series there is a valuable and useful added sedative action. The analgetic action of the new compositions greatly exceeds pharmacologically related products such as Veritol and ephedrine. Veritol is β-(p-oxyphenol)-isopropylmethylamine.

We claim:

A method of treating animals and humans in need of an analgesic and sympathomimetic which comprises administering to such animals and humans a composition the essential active constituent of which is a compound selected from the group consisting of 4-methyl-2-amino-pyridine and its pharmaceutically acceptable acid addition salts, said composition being free from cocaine-like effects and administered in an amount to provide a dosage of about 100 to 200 milligrams of the compound and the composition containing, in addition to the compound, a pharmaceutical vehicle therefor.

References Cited in the file of this patent

Berichte Dtsch. Chm. Ges., vol. 57, Jan.–June 1924, pp. 791–793.
Chem. Abst., vol. 49, 1955, pp. (14, 183e) and (16, 232h).
D.T.N. (Mfg. Sec.), Mar. 19, 1951, p. 44.
Science News Letter, Apr. 25, 1953, p. 259.
Nature, Apr. 14, 1956, p. 703.
Sollmann: Manual of Pharmacol., 7th ed., 1948, Saunders, Philadelphia, pp. 263, 265, 269–274.